April 27, 1965
F. KOHLER
Re. 25,771
WELDING OF MULTIWALL TUBING
Original Filed Sept. 21, 1961
2 Sheets-Sheet 1
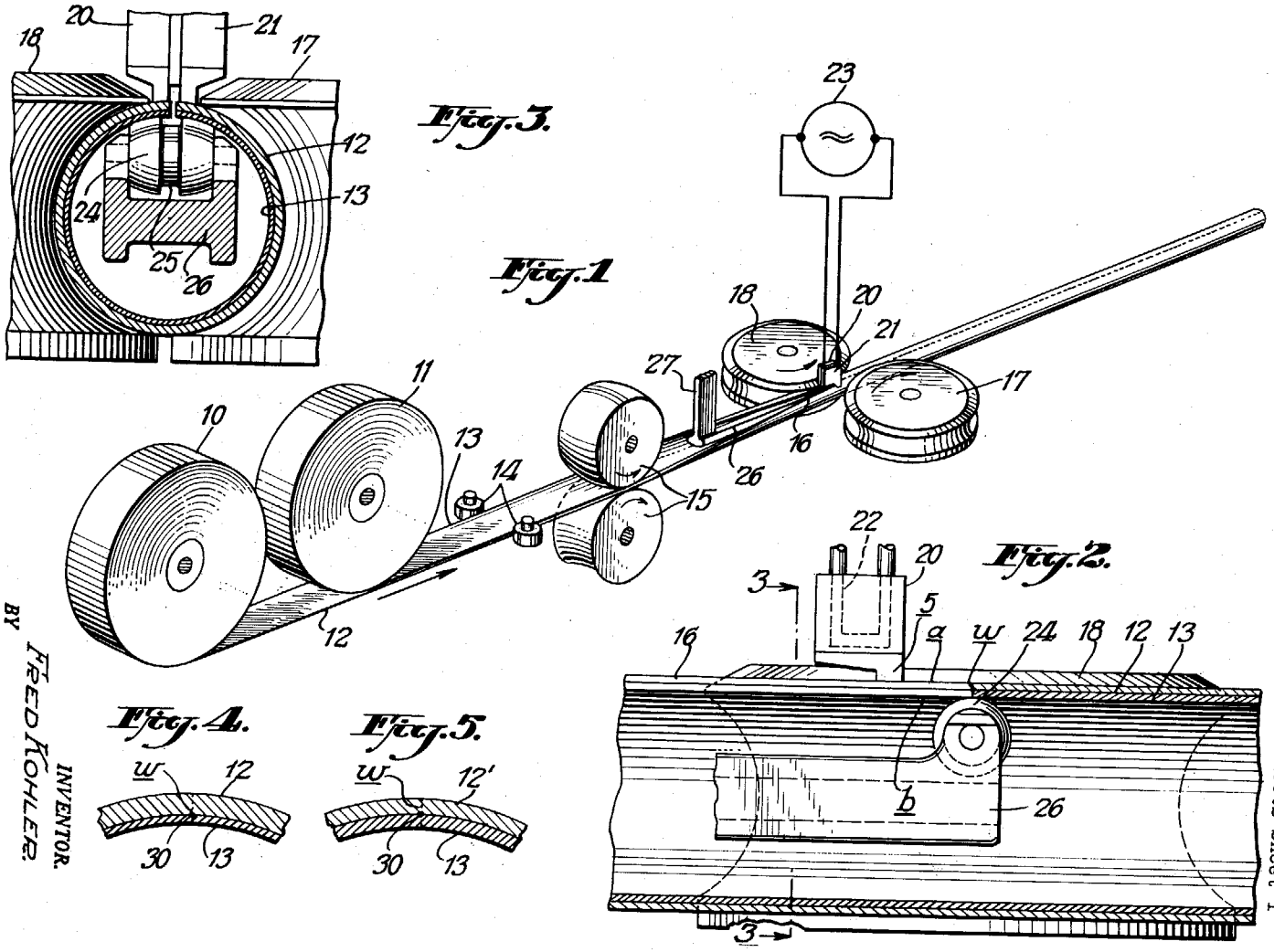
INVENTOR.
FRED KOHLER.
BY
Ward, Neal, Haselton, Ormet, McElhannon
ATTORNEYS.

April 27, 1965 F. KOHLER Re. 25,771

WELDING OF MULTIWALL TUBING

Original Filed Sept. 21, 1961 2 Sheets-Sheet 2

INVENTOR.
FRED KOHLER.
BY
Ward, Neal, Haselton, Orme & McChannon
ATTORNEYS.

United States Patent Office

Re. 25,771
Reissued Apr. 27, 1965

25,771

WELDING OF MULTIWALL TUBING

Fred Kohler, New York, N.Y., assignor, by mesne assignments, to American Machine & Foundry Company, New York, N.Y., a corporation of New Jersey Original No. 3,118,045, dated Jan. 14, 1964, Ser. No. 139,642, Sept. 21, 1961. Application for reissue July 13, 1964, Ser. No. 393,804
3 Claims. (Cl. 219—59)

Matter enclosed in heavy brackets [ ] appears in the original patent but forms no part of this reissue specification; matter printed in italics indicates the additions made by reissue.

This invention relates to methods and apparatus for welding tubing, the walls of which are formed of a plurality of thicknesses of metal, for example two layers of sheet metal comprising an outer wall and an inner wall fitting closely within and embraced by the outer wall and the two walls being welded together along the weld line of each.

In accordance with the invention, the inner and outer walls of the tubing, if desired, may be of different thicknesses; also, if desired, of different metals, so that, for example, alternatively the outer or the inner wall, one or the other, may be of a good corrosion resistant metal or a metal having high electrical conductivity, for example as compared with the other wall. As other examples, one or the other of the walls may be of metal such as steel having high strength or wear-resistant properties, while the other wall is of a more ductile or flexible metal, depending upon the conditions of use intended for the tubing.

Heretofore, so far as is known, it has not been possible to manufacture multi-walled welded tubing of the types above referred to, with such efficiency or of such quality as to be worthwhile for extensive use. And heretofore for welding continuous lengths of metal tubing with relatively thick walls, the difficulty has been faced that the relatively thick skelp required to make such thick-walled tubing is readily available only in finite lengths or strips, whereas for continuously welding thin-walled tubing, the skelp material or sheet metal ribbon has been much more conveniently available for use in very long lengths supplied on the market in the form of coils. Thus the present invention makes it possible continuously to form and weld relatively thick-walled tubing by using two relatively thin strips of skelp conveniently available in coil form and also thus available in a form which may be conveniently shipped.

The present invention is adaptable for the formation of double-walled tubing for example in which the weld line either extends longitudinally of the tubing or helically about the tubing. In either case, the edges of the metal strips for forming the inner and outer wall layers are brought together along a V-shaped gap which becomes closed at the weld point (or weld line) forming a butt weld wherein the pair of edges on the outer layer is welded together, as are also the edges on the inner layer, and at the same time the inner and outer layers are welded together along the weld line so that concurrently in effect a total of four edges become integrally welded together, thus securing the inner tube layer in fixed position with respect to and tightly embraced by the outer layer.

It may be noted that any attempt to form such a composite or multiwall weld by use of direct current or low frequency current applied across or adjacent the weld point would present substantially insurmountable difficulties regardless of the way in which the current is attempted to be applied for heating the metal at the weld point. That is, if said current were applied to the exterior of the outer tube wall, then great difficulty would be encountered in heating the opposed edges which are to be welded on the inner tube wall. This is because with such low frequency or direct current heating methods, very heavy current has to be used, with a very low voltage drop of only several volts for example across the weld point, and with such a low voltage drop, the resistance presented at the engaging surfaces of the inner and outer tube layers will be so great as to prevent proper conduction of sufficient heating current to the inner layer. Similar difficulties or others would be met with in attempting to use arc means for forming a uniform multiwall weld such as here involved.

In accordance with the present invention, however, it has been found that the desired heating and welding of the multiwall structure at and between the outer and inner tube layers at the weld line, may be rapidly and efficiently accomplished with a high degree of uniformity, by the use of high frequency current, for example, a frequency of 50,000 cycles per second or preferably higher, such as in the range of 300 to 500 kilocycles, such current being *preferably* applied by contacts connected respectively to the terminals of a high frequency generator and the contacts being applied respectively to opposite sides of a V-shaped gap shortly in advance of the weld point where the edges of the metal of the multiwall are pressed together and welded as the tubing rapidly advances, the high frequency current flowing along the gap edges from the contacts respectively to and from the weld point. The use of such high frequency current in this way for the purpose is particularly advantageous not only because of the fact that, by reason of proximity effect, the current flowing along each edge of the V-shaped gap in one direction is closely concentrated on that edge, because of the current flowing in the opposite direction on the opposed edge, but also, because of the "skin effect" obtained with such high frequency current, a part of the current tends to be concentrated on the outermost portions of the edges of the outer tube layer, whereas another portion of the current tends to be concentrated on the innermost portions of the edges of the inner wall of the tubing just in advance of the weld point. Thus, even though the high frequency current may be applied by contacts engaging at or adjacent the outermost portions of the outer wall surfaces of the tubing, yet a sufficient portion of such current will follow along the innermost portions of the approaching gap edges of the inner wall layer to assure that same will be heated to welding temperature at the weld point along with the heating of the edges of the outer layer. The problem of resistance to current flow between the engaging surfaces of the inner and outer layers becomes of no substantial consequence with such high frequency current, whereas with low frequency or direct current, such resistance would prevent the proper heating of the edges of the inner wall.

Various further and more specific objects, features and advantages of the invention will appear from the description given below, taken in connection with the accompanying drawings, illustrating by way of example preferred forms of the invention.

In the drawings:

FIG. 1 is a somewhat schematic perspective view of a preferred embodiment of apparatus for carrying out the invention;

FIG. 2 is an enlarged vertical sectional view at the general location of the weld point in such apparatus;

FIG. 3 is a vertical transverse sectional view taken substantially along the line 3—3 of FIG. 2;

FIG. 4 is a transverse sectional view taken transversely through a portion of multiwall tubing welded in accordance with the invention and having an outer layer, for example, somewhat thicker than the inner layer;

FIG. 5 is a similar view wherein the outer and inner layers are of the same thickness; in both views, FIGS. 4 and 5, the weld point, or strictly speaking the line of the weld, is indicated at w;

Figure 6:
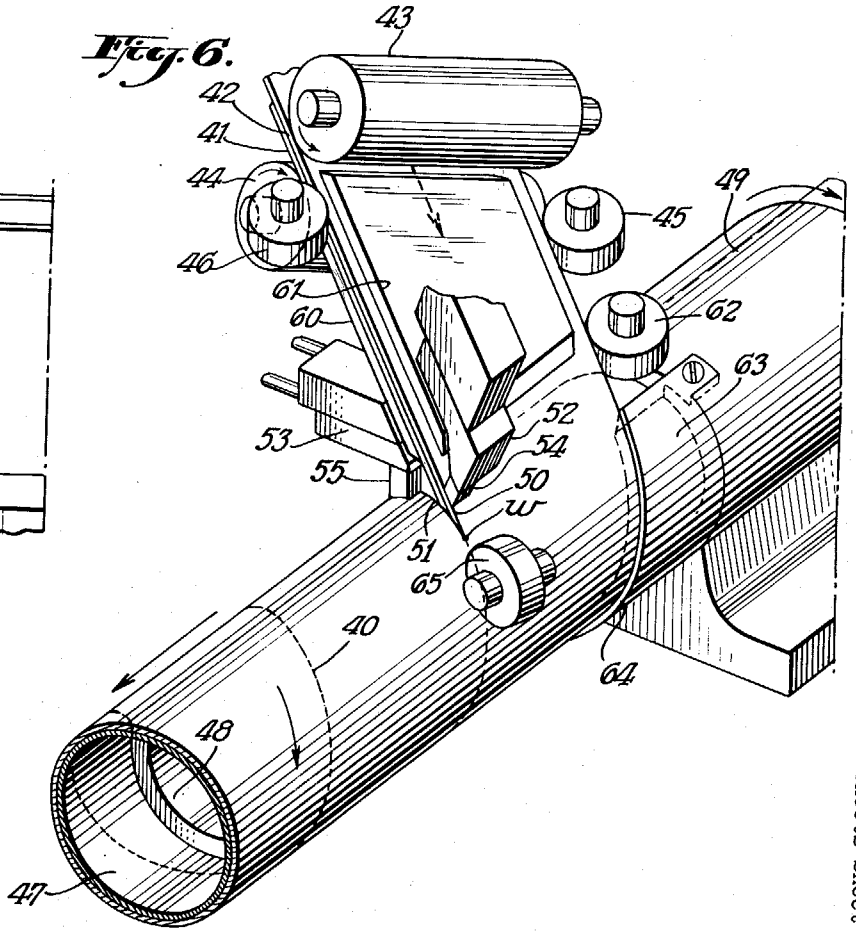
FIG. 6 is a somewhat schematic perspective view of an alternative form of the invention wherein the multiwall tube has a helical weld.

Referring now to FIG. 1 in further detail, the arrangement as here indicated is shown as adapted for the formation of multiwall tubing formed of two layers, the skelp or strip for forming same respectively being supplied in the form of coils as at 10 and 11, suitably mounted so that the strips 12 and 13 may be withdrawn therefrom and advanced in the direction indicated by the arrows, past suitable rollers as at 14 for engaging the edges thereof to assure that such edges will coincide, the strips thence passing suitable guide or forming rollers as at 15, of which there may be, if desired, several pairs of conventional known form, for forming the skelp into tubing having a logitudinal gap as indicated at 16.

The thus-formed tubing is continuously advanced between a pair of suitably shaped pressure rollers as at 17, 18, which cause the tube gap to be closed substantially at the weld point or line as indicated at w in FIG. 2. Shortly prior to the weld point, two contacts are suitably mounted as indicated at 20, 21, these being formed with internal cooling fluid cavities as indicated at 22 and being connected respectively to the terminals of a suitable source of high frequency current 23, so that the currents of frequencies of the ranges hereinabove specified may be applied to flow from these contacts respectively along the opposed edges of the gap 16 to and from the weld point.

In order to support the portions of the inner layer of the tubing being formed and to urge same at the regions adjacent the gap 16 firmly up against the adjacent gap edge portions of the outer layer, the roller arrangement as shown in FIGS. 2 and 3, may be provided internally of the formed tubing, a roller as indicated at 24 being generally barrel shaped and preferably provided with a central groove as at 25 at the region of the weld line so as not to interfere therewith. This roller as shown may be supported on a suitable bracket as at 26 extending back and having a supporting portion as at 27 extending up and outwardly of the tube formation.

The high frequency current applied in the manner above described to flow from the contacts along the gap edges to and from the weld point is capable to a surprising degree of uniformly heating the opposed multiwall edges in the tube gap, that is, both the edges of the outer layer and of the inner layer. This is evidently true not only because of the proximity effect due to the flow of current in opposite directions at any one moment along the opposed gap edges, but also because, due to the so-called "skin effect," the current in flowing from one of the contact shoes as at s (FIG. 2) tends to be partly urged to flow along and be concentrated toward the uppermost portion a of the edge of the outer layer to the weld point, while another portion of the current tends to be caused to flow along and be concentrated toward the lowermost portion b of the inner layer. With currents of such frequencies, factors involving ohmic resistance are relatively inconsequential as compared with reactance factors, and accordingly any such ohmic resistance as may occur along the line of separation of the inner and outer layers presents no obstacle to the concentration of adequate current to flow along the edges of the gap on the inner layer. As a consequence, the opposed gap edges on both layers may be quickly heated to welding temperature and become butt welded together, as indicated in FIGS. 4 and 5, and at the same time the inner layer will be welded to the outer layer along the line indicated at 30 in FIGS. 4 and 5, thereby fixing the position of the inner wall with respect to the outer walls throughout their lengths. The slight upset of the metal downwardly from the butt weld of the outer layer and upwardly from the butt weld of the inner layer, will insure, under pressure of the roller 27, that the two weld lines will become welded together along said line 30.

Figure 7:
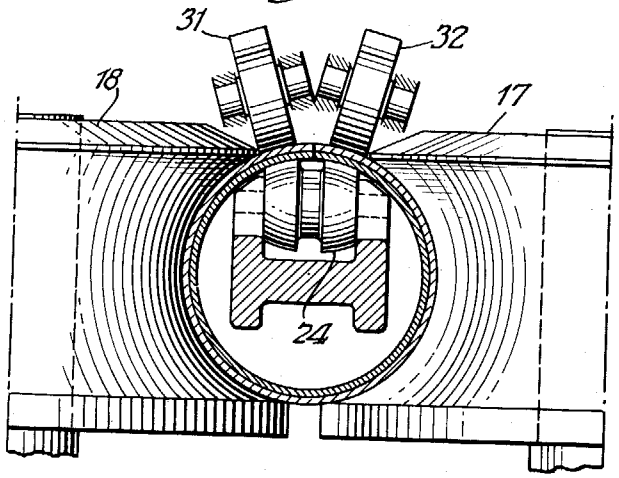
FIG. 7 is a transverse sectional view corresponding to that of FIG. 3, but showing a possible alternative arrangement of parts.

The roller arrangement shown in FIG. 7 may be similar to that of FIG. 3, except on the exterior of the tubing at each side of the weld, a pair of rollers as at 31, 32 may be mounted in angular positions so as to bear down respectively on the portions of the outer layer of the tubing at either side of the line of the weld and at the regions where the inner roller 24 is pressing upwardly. Thereby all of the edges of the multiwall layers at the region of the weld are kept under control against transverse vibration or other undesired movements.

Reference will now be made to the embodiment shown in FIG. 6, wherein the tubing is formed with a helical weld line as indicated at 40. Here two superposed metal ribbons or layers of skelp or the like as at 41, 42, are advanced (for example from coils thereof as in FIG. 1) in the direction indicated by the arrow, by suitable rollers as indicated at 43, 44, edge guide rollers being provided at 45, and 46. The strips 41, 42 are guided at such an angle with respect to the axis 47 of the formed tubing so as to come tangentially into position helically to form the walls of such tubing. To aid such guiding, suitable means may be provided such as a mandrel portion 48 extending interiorly of the formed tubing and supported by suitable bracket means as at 49, although it will be understood that guiding means other than such a mandrel might be used. The forward edges of the strips 41 and 42 as they are about to form into a convolution are positioned as at 50 to come into abutting engagement with the trailing edges as at 51 of the previously positioned convolution, so that the opposed edges of the inner and outer layers will become welded to each other and together at the region indicated at w. As in the case of FIG. 1, the edges are heated prior to the weld region by the application of contacts as at 52, 53 connected respectively to the terminals of the high frequency source of current and having contact shoes as at 54, 55 engaging the metal at opposite sides of the gap in advance of the weld region w. It will be understood that these contacts may be applied as shown to the outer surface of the metal, or if preferred, they may engage the edges per se of one or both of the layers at opposite sides of the gap in advance of the weld region.

In advancing the superposed ribbons into position as shown in FIG. 6, same should be positioned with their edges at an angle to the axis of the tubing corresponding to the pitch of the desired helically welded seam and in order firmly to retain the strips in positions tangentially to approach, as shown, the convolution being formed of the desired tubing and at the correct angle, various further expedients may be used. For example, the superposed strips may be engaged beneath and above by flat plates as at 60, 61. Also an additional roller as at 62, spring-pressed if desired, may be provided to urge the ribbons edgewise toward the region of the welding and at the same time the trailing edge of the convolution being formed may be guided, if desired, by a shoe means 63 having an appropriate helical-shaped guide edge 64. Finally, in order to press the region of the welding firmly down toward the mandrel supporting same underneath and to press the upper strip firmly down onto the lower strip to insure welding of the two together, there may be provided a suitable roller means as at 65 weighted or spring-pressed if desired.

Thus a helically welded multiwall tube may be provided with a helical weld line at which butt welds are provided on both the inner and outer layers, and such butt welds also being welded together (similarly as in FIGS. 4 and 5) so that the inner layer is fixed in position and embraced by the outer layer, the two being affixed together in effect throughout by a helical weld line therebetween.

The speed of advance of the strips or skelp to and past the region of welding may be quite rapid and readily determined by trial, with the arrangements of both FIGS. 1 and 6, and so as to insure that welding temperature will be reached at the region of welding and without heating the metal to such welding temperature, except at the very edge surfaces thereof, thereby making possible a good so-called "forged" type of weld, inasmuch as the metal in back of the edge surfaces will remain at all times firm and solid, allowing the edge surfaces to be firmly pressed together with little or no noticeable metal which has become molten remaining between the abutting edges. However, a slight amount of metal will tend to be upset downwardly from the lower surface of the upper strip or ribbon along the weld line, whereas there will tend to be an upset from the upper surface of the lower strip, and such upsetting will insure that the upper butt weld will become welded to the lower butt weld, in view of the pressure applied to force the strips together along the weld line by the action of the various rollers such as 17, 18 and 24 in FIGS. 1–3 and rollers 24, 31 and 32 in FIG. 7 and the roller 65 in FIG. 6. The invention is adapted for making a multiwall tube with both walls of like or similar ferrous metal or with one relatively harder than the other, as desired, or with one or both formed of another and non-ferrous metal such as copper or aluminum, or various alloys, and with each layer of any desired thickness within reasonable limits.

If desired, in order to prevent wasted current flowing circumferentially around the back side of the tube, suitable core means may be mounted within the tube, formed of magnetic insulating material having a low loss factor, such as disclosed in U.S. patent to Stanton et al. No. 2,833,910. Also, if desired, in order further to control and concentrate the current to the extent desired along the gap edges, strips or masses of such material may be placed along adjacent such edges, as taught in U.S. patent to Rudd et al. No. 2,857,503, and to further control the distribution of the current in depth on the gap edges, either such core material as disclosed in that patent may be used, or in some cases high conductivity masses or blocks may be used, as taught in U.S. patent to Rudd et al. No. 2,904,668.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for forming and welding multiwall metal tubing which comprises: advancing extensive lengths of metal strips which are to form respectively interior and exterior walls of the tubing, while shaping such strips into the form of tubes, one enclosing and embracing the other as same reach a weld point; maintaining the strips as thus advanced with their edges coterminous, with one superposed upon the other and while maintaining the strip edges with a V-shaped gap therebetween in advance of the weld point and with the apex of the gap at or adjacent said point; applying sufficient high frequency current conductively to the metal on opposite sides of said gap in advance of the weld point to heat the edges at said gap to welding temperature on reaching said point, the path of such current extending from the point of application on one side of said gap, thence to the weld point and back to the point of application on the other side of said gap, and the current being of a frequency sufficiently high whereby same is by reason of proximity effect concentrated on the surfaces of said edges with portions thereof by reason of the skin effect concentrated on both the uppermost and lowermost portions of the edge surfaces, thereby heating the edge surfaces of both the inner and outer wall layers to said welding temperature; and applying pressure at the weld point to force the opposed edges of each layer together and to press the layers together at the line of the weld, whereby the opposed edges of the outer layer become butt welded together as do also the opposed edges of the inner layer, and the butt weld of the outer layer becomes welded to the butt weld of the inner layer.

2. In a method for forming multiwall metal tubing by helically winding at least two superposed metal ribbons to form successive convolutions both ribbons of which are joined together at their edges by a helical butt welded seam, the combination of steps which comprises: advancing the ribbons in superposed position and with their edges coterminous, generally flatwise and tangentially of a convolution of the desired tubing with the edges of the ribbons positioned at an angle to the axis of the tubing being formed, corresponding to the pitch of the desired helically welded seam; forming the thus superposed ribbons into a succession of convolutions while advancing said convolutions longitudinally of said axis; pressing together and butt welding at a substantially fixed weld point the trailing edges of the ribbons of a convolution to the forward edges respectively of the ribbons of the succeeding convolution and at the same time welding together the butt welds of the two ribbons, by applying sufficient heating current of a frequency of 50,000 cycles per second or higher to said edges to heat same to welding temperature in advance of the weld point.

*3. Method for forming and welding multiwall metal tubing which comprises: advancing extensive lengths of metal strips which are to form respectively interior and exterior walls of the tubing, while shaping such strips into the form of tubes, one enclosing and embracing the other as same reach a weld point; maintaining the strips as thus advanced with their edges coterminous, with one superposed upon the other and while maintaining the strip edges with a V-shaped gap therebetween in advance of the weld point and with the apex of the gap at or adjacent said point; supplying sufficient high frequency current to the metal on opposite sides of said gap in advance of the weld point to heat the edges at said gap to welding temperature on reaching said point, the path of such current extending from a point on one side of said gap, thence to the weld point and back to a point on the other side of said gap, and the current being of a frequency sufficiently high whereby same is by reason of proximity effect concentrated on the surfaces of said edges with portions thereof by reason of the skin effect concentrated on both the uppermost and lowermost portions of the edge surfaces, thereby heating the edge surfaces of both the inner and outer wall layers to said welding temperature; and applying pressure at the weld point to force the opposed edges of each layer together and to press the layers together at the line of the weld, whereby the opposed edges of the outer layer become butt welded together as do also the opposed edges of the inner layer,*

*and the butt weld of the outer layer becomes welded to the butt weld of the inner layer.*

References Cited by the Examiner

The following references, cited by the Examiner, are of record in the patented file of this patent or the original patent.

UNITED STATES PATENTS

| | | | |
|---|---|---|---|
| 2,222,579 | 3/40 | Walcott | 219—67 |
| 2,258,564 | 10/41 | Armstrong et al. | 138—142 |

| | | | |
|---|---|---|---|
| 2,429,580 | 10/47 | Janecek et al. | 138—142 |
| 2,549,032 | 4/51 | Taylor | 113—35 |
| 2,687,464 | 8/54 | Crawford | 219—8.5 |
| 2,752,873 | 7/56 | Freeze | 113—35 |
| 2,794,108 | 5/57 | Park | 219—67 |
| 2,816,208 | 12/57 | McDowall | 219—59 |
| 2,873,353 | 2/59 | Rudd | 219—62 |

RICHARD M. WOOD, *Primary Examiner.*